(12) United States Patent
Kim et al.

(10) Patent No.: US 10,222,126 B2
(45) Date of Patent: Mar. 5, 2019

(54) CONDENSATION HEAT EXCHANGER HAVING DUMMY PIPE

(71) Applicant: KITURAMI BOILER CO., LTD., Gyeongsangbuk-do (KR)

(72) Inventors: Tae-Young Kim, Ulsan (KR); Hae-Young Jung, Daegu (KR); Kyoung-Soo Lee, Gyeongsanbuk-do (KR)

(73) Assignee: KITURAMI BOILER CO., LTD., Cheongdo-gun, Gyeongsangbuk-do (KR)

( * ) Notice: Subject to any disclaimer, the term of this patent is extended or adjusted under 35 U.S.C. 154(b) by 0 days.

(21) Appl. No.: 14/438,155

(22) PCT Filed: May 6, 2013

(86) PCT No.: PCT/KR2013/003899
§ 371 (c)(1),
(2) Date: Apr. 23, 2015

(87) PCT Pub. No.: WO2014/065479
PCT Pub. Date: May 1, 2014

(65) Prior Publication Data
US 2015/0241130 A1    Aug. 27, 2015

(30) Foreign Application Priority Data

Oct. 23, 2012  (KR) .................. 10-2012-0117604

(51) Int. Cl.
*F28D 1/04*    (2006.01)
*F24H 8/00*    (2006.01)
(Continued)

(52) U.S. Cl.
CPC ............. *F28D 1/0443* (2013.01); *F24H 8/00* (2013.01); *F28D 7/163* (2013.01); *F28D 7/1623* (2013.01);
(Continued)

(58) Field of Classification Search
CPC .......... F28F 3/086; F28F 9/0229; F28F 9/028; F28F 1/00; F28F 2210/10; F28F 2250/06;
(Continued)

(56) References Cited

U.S. PATENT DOCUMENTS 4,991,648 A * 2/1991 Magari .................... B01J 8/067
                                              165/159
6,394,176 B1 * 5/2002 Marsais .................. F25B 39/04
                                              165/134.1
(Continued)

FOREIGN PATENT DOCUMENTS

KR   1020010069808        7/2001
KR     20020067301 A  *  8/2002
(Continued)

*Primary Examiner* — Jianying C Atkisson
*Assistant Examiner* — Raheena R Malik
(74) *Attorney, Agent, or Firm* — Studebaker & Brakett PC

(57) ABSTRACT

A condensation heat exchanger having dummy pipes is provided in which a plurality of condensation heat exchange pipes are connected with water housings so as to recover latent heat while the water is circulating, and, by having the dummy pipes, penetrating the water housings, arranged in between the condensation heat exchange pipes, the pressure applied to the water housings is distributed and smooth flow of water is facilitated.

1 Claim, 3 Drawing Sheets

(51) Int. Cl.
*F28D 7/16* (2006.01)
*F28D 21/00* (2006.01)
*F28F 13/06* (2006.01)

(52) U.S. Cl.
CPC .......... *F28D 21/0007* (2013.01); *F28F 13/06* (2013.01); *F28F 2270/02* (2013.01); *Y02B 30/102* (2013.01)

(58) Field of Classification Search
CPC .... F28F 2265/10; F28F 3/005; F28F 2270/02; F28F 13/06; F28F 2265/26; F28F 2270/00; F28D 1/0443; F28D 7/163; F28D 7/1623; F28D 21/0007; F24H 8/00; Y02B 30/102
USPC ........................... 122/14.3; 165/157; 11/14.3
See application file for complete search history.

(56) References Cited

U.S. PATENT DOCUMENTS

| | | | |
|---|---|---|---|
| 6,883,600 B2* | 4/2005 | Mano | B60K 6/40 165/140 |
| 7,096,932 B2* | 8/2006 | Scoville | F28D 1/0443 165/135 |
| 2002/0040776 A1* | 4/2002 | Kokubunji | F28D 1/0443 165/140 |
| 2005/0006068 A1* | 1/2005 | Desai | F28D 1/0443 165/140 |
| 2007/0056718 A1* | 3/2007 | Yamamoto | F28D 1/0443 165/140 |
| 2007/0137839 A1* | 6/2007 | Yamamoto | F28D 1/0443 165/140 |
| 2007/0187077 A1* | 8/2007 | Kwon | F28D 1/0443 165/140 |
| 2008/0115528 A1* | 5/2008 | Yamamoto | B60H 1/3227 62/513 |
| 2009/0078399 A1* | 3/2009 | Makita | F28D 1/0443 165/173 |
| 2011/0168372 A1* | 7/2011 | Takahashi | F28D 1/0443 165/173 |

FOREIGN PATENT DOCUMENTS

| | | |
|---|---|---|
| KR | 1020020067301 | 8/2002 |
| KR | 1020040017448 | 2/2004 |
| KR | 1020040071015 | 8/2004 |
| KR | 1020110107014 | 9/2011 |

* cited by examiner

[Fig. 1]
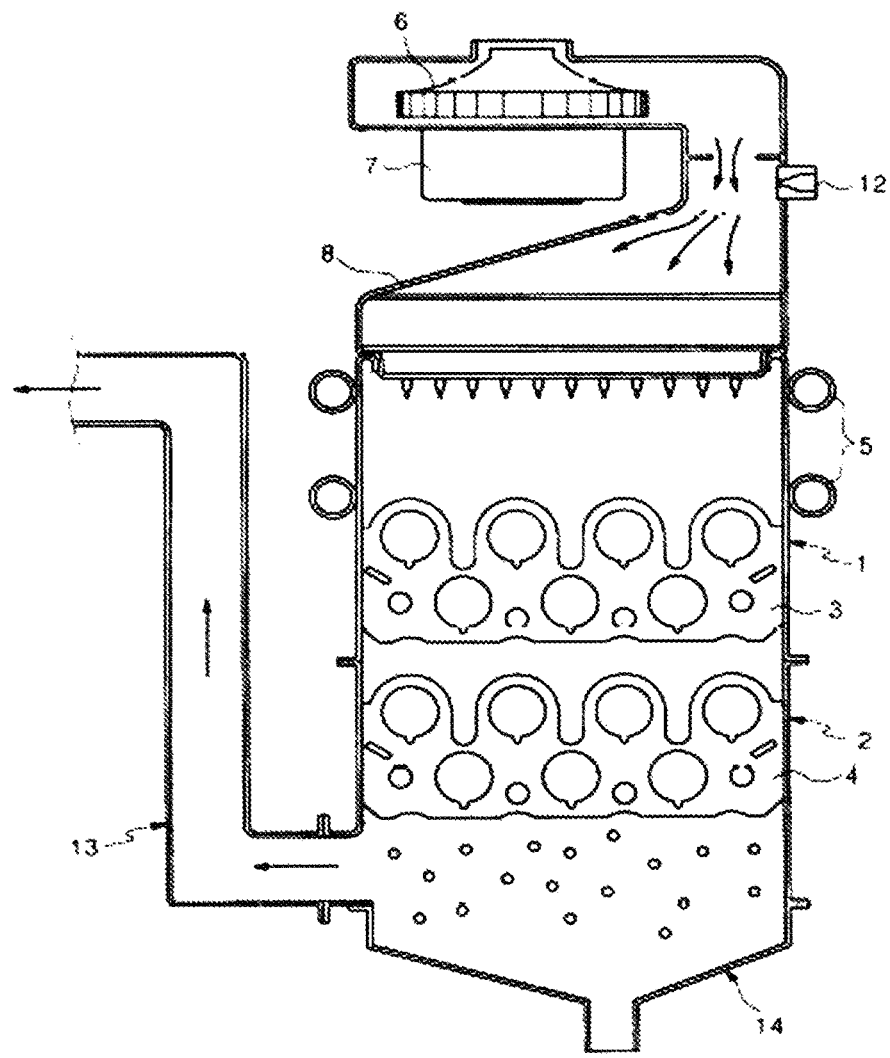
-- Prior Art --

[Fig. 2]
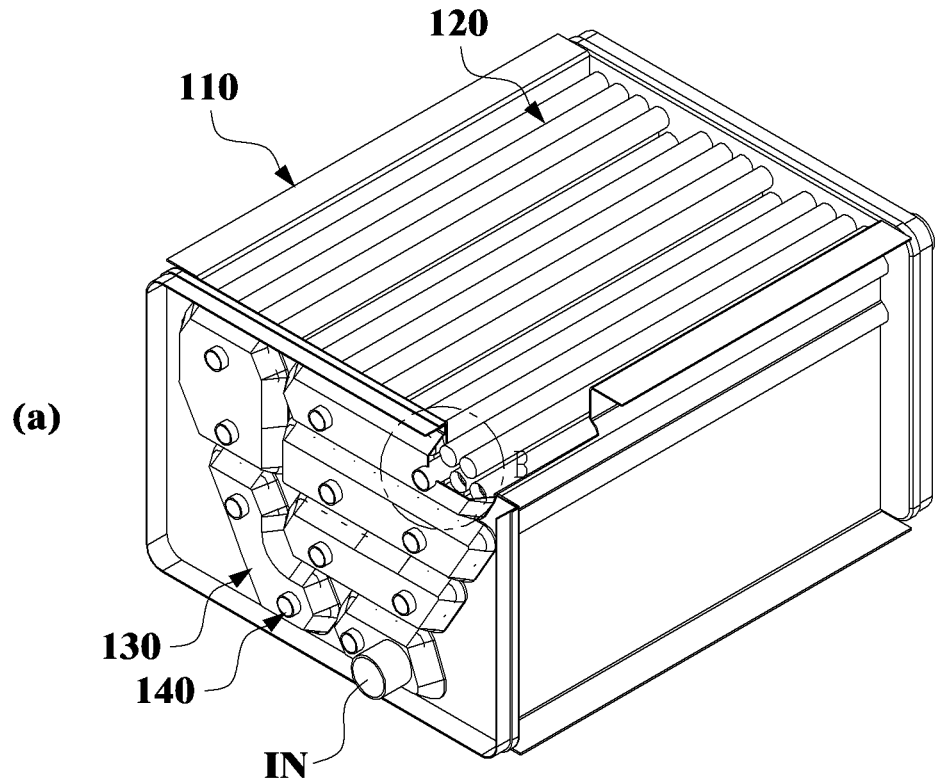
(a)
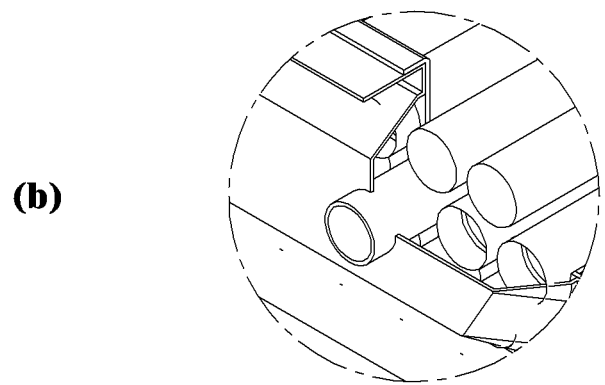
(b)

[Fig. 3]
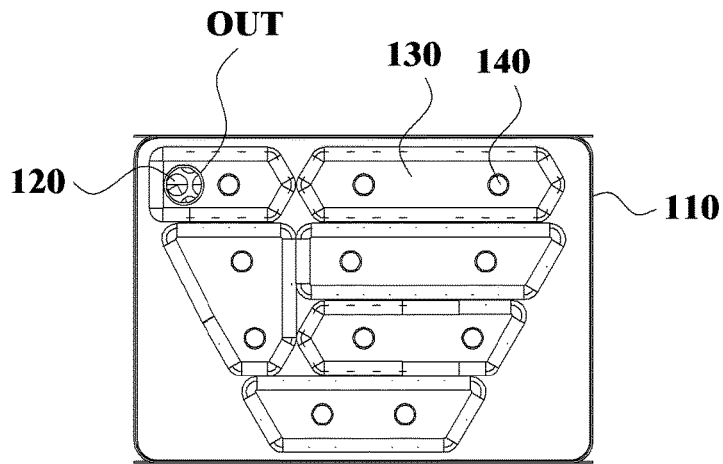
[Fig. 4]
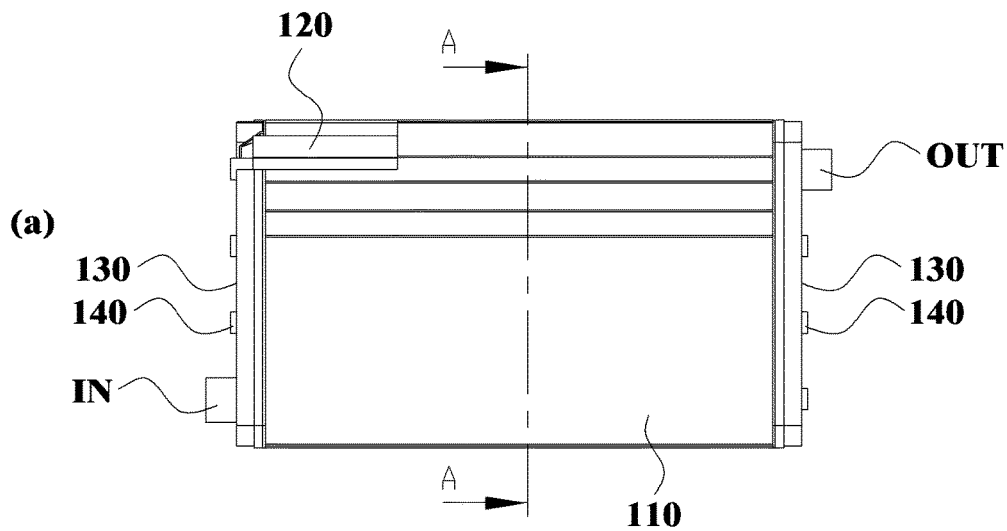
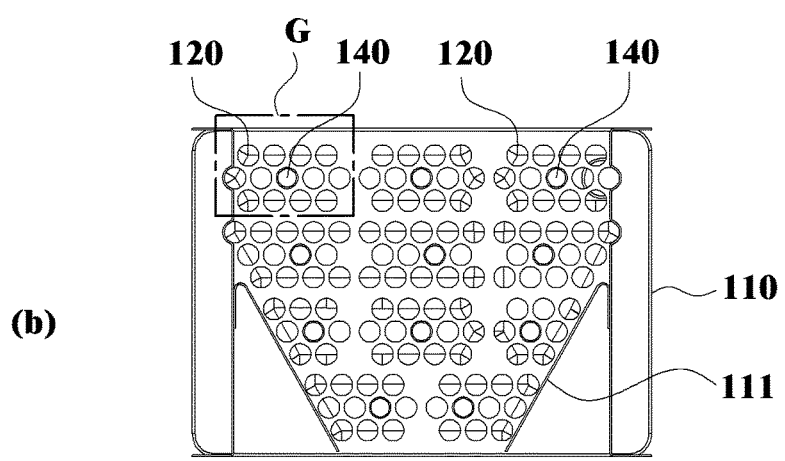

CONDENSATION HEAT EXCHANGER HAVING DUMMY PIPE

BACKGROUND

The present invention relates to a condensation heat exchanger having dummy pipes and, more particularly, to a condensation heat exchanger having dummy pipes, in which a plurality of condensation heat exchange pipes are connected by means of water housings so as to recover latent heat while the water is circulating, and, by having the dummy pipes, penetrating the water housings, arranged in between the condensation heat exchange pipes, the pressure applied to the water housings is distributed and smooth flow of water is facilitated.

Generally, a heat exchanger is a device for exchanging heat between two kinds of adjacent fluids having different temperatures. Such a heat exchanger is employed in a variety of cooling/heating apparatuses, including a boiler, an air conditioner, or the like, for the purposes of heating, air-conditioning, power-generation, cooling, recovery of waste heat, or the like.

Particularly, as shown in FIG. 1, a condensing boiler employs a sensible heat exchanger 1 which exchanges sensible heat with respect to flame and combustion gas occurring upon combustion of fuel, and a latent heat exchanger 2 which exchanges latent heat with respect to combustion gas.

Korean Patent Nos. 390521, 386717, and the like proposed a heat exchanger in which heat exchange pipes are arranged in a heat exchanger body and are connected by water housings or similar components (referred hereinafter to as water housings) attached to the outer sides of the body, thereby forming a compact heat exchanger.

According to such a conventional technique, however, problems arise in that, since lots of heat exchange pipes are collectively connected to the water housings, water pressure of water flowing through the heat exchanger pipes against the water housings increases, possibly causing a failure of the water housings such as being deformed, detached, or the like.

Further, another problem arises in that, when the heat exchange pipes are connected by water housings as such, water is simultaneously introduced into respective water housings from lots of heat exchange pipes, so that only a single water flow occurs in the water housings, as well as water flow becomes unsmooth, resulting in water-circulation being slowed down and therefore making it difficult to supply hot water or heating water quickly.

SUMMARY OF THE INVENTION

Accordingly, the present invention has been made keeping in mind the above problems occurring in the prior art, and an object of the present invention is to provide a condensation heat exchanger having dummy pipes, in which a plurality of condensation heat exchange pipes are connected by means of water housings so as to recover latent heat while the water is circulating, and, by having the dummy pipes, penetrating the water housings, arranged in between the condensation heat exchange pipes, the pressure applied to the water housings is distributed and smooth flow of water is facilitated.

In order to accomplish the above object, the present invention provides a condensation heat exchanger including: a body section surrounded by side plates while being opened at upper and lower portions thereof; a plurality of heat exchange pipes closely arranged between opposite side plates of the body section while passing therethrough, with a gap through which a hot combustion gas passes; a plurality of water housings assembled to outer surfaces of the opposite side plates and configured to connect the heat exchange pipes together so that water flows through the heat exchange pipes; and a dummy pipe arranged among the heat exchange pipes while passing through both the opposite side plates of the body section and the water housings attached to the outer surfaces thereof.

Here, preferably, the heat exchange pipes may be divided into a plurality of groups separated from each other, the water housings may connect the groups together, and the dummy pipe may be disposed in one or more groups.

Further, preferably, the dummy pipe may be disposed at the center of the respective group.

According to the present invention, heat exchange pipes horizontally installed in the body section of the heat exchanger are connected by the water housings, so that latent heat can be recovered while water is circulated in the water housings. Thus, it is possible to recover latent heat only using the heat exchange pipes each having no heat exchange fins.

Further, the dummy pipe passing through the water housings is disposed in between the heat exchange pipes, which serves to guide water flow smoothly while distributing water pressure applied to the water housings.

BRIEF DESCRIPTION OF DRAWINGS

FIG. 1 is a cross-sectional view showing a condensing boiler employing a conventional heat exchanger;

FIG. 2 is a perspective view showing a condensation heat exchanger having a dummy pipe according to an embodiment of the present invention;

FIG. 3 is a side view showing the condensation heat exchanger having the dummy pipe according to the embodiment of the present invention; and FIG. 4 is a front view showing the condensation heat exchanger having the dummy pipe according to the embodiment of the present invention, together with a view taken along line A-A of the front view.

DETAILED DESCRIPTION OF THE INVENTION

A description will now be made of a condensation heat exchanger having a dummy pipe according to a preferred embodiment with reference to the accompanying drawings.

While in the description, a position where a burner is installed is defined as being an upper side of the heat exchanger and an opposite position is defined as being a lower side of the heat exchanger, it is clear that the upper and lower sides may change depending on the position of the burner.

Further, it is also clear that water inlet and outlet specified in the description may change if water flow changes according to change of design.

The condensation heat exchanger shown in FIG. 2 includes a body section 110, condensation heat exchange pipes 120 through which water flows, water housings 130 which connect the heat exchange pipes 120, and a dummy pipe 140 which serves to guide water flow smoothly while distributing water pressure applied to the water housings 130.

Thus, heat exchange pipes 120 horizontally installed in the body section 110 of the heat exchanger are connected by the water housings 130, so that latent heat can be recovered while water is circulated in the water housings. Thus, it is possible to recover latent heat only using the heat exchange pipes 120 each having no heat exchange fins.

Further, the dummy pipe 140 passing through the water housings 130 is disposed in between the heat exchange pipes 120, which serves to guide water flow smoothly while distributing water pressure applied to the water housings 130.

To this end, the body section 110 of the heat exchanger is surrounded by front/rear/left/right side plates while being opened at upper and lower portions thereof. That is, it is shaped as being surrounded by front/rear/left/right side plates, so that a hot combustion gas, which is generated by combusting fuel in a burner, passes through the body section from the upper side to the lower side, and vice versa.

The condensation heat exchange pipes 120 consist of a plurality of pipes, which are horizontally disposed between opposite side plates of the body section 110 while passing through the side plates.

Further, the heat exchange pipes 120 are closely arranged with gaps therebetween, so that combustion gas can pass through the gaps of the heat exchange pipes 120, allowing all of the heat exchange pipes to exchange heat therebetween.

While the heat exchange pipes 120 may have a circular cross section as shown in the drawings, it is clear that the cross sectional shape of the pipe (or 'tube') be of a variety of shapes such as an oval or egg-like shape.

Further, while the heat exchange pipes 120 may have the same diameter as shown in the drawings, they may have different diameters according to positions of the heat exchange pipes assembled to the body section 110.

The water housings 130 are assembled to outer surfaces of the opposite side plates of the body section 110, at which opposite open ends of the heat exchange pipes 120 are exposed to the outside. That is, as shown in FIGS. 2 and 3, the water housings 130 are installed to opposite side plates, respectively.

Such a water housing 130 covers the side plate and the open ends of the heat exchange pipes 120 provided on the side plate so that it defines an internal space for water flow. Thereby, water sequentially flows through all of the heat exchange pipes 120.

In one embodiment, one of the water housings 130 installed on one side plate is provided with a water inlet (IN) and one of the water housings 130 installed on the opposite side plate is provided with a water outlet (OUT).

Thus, water supplied from the water inlet (IN) is circulated through the heat exchange pipes 120 and then discharged out of the water outlet (OUT). The water discharged out of the water outlet (OUT) is heat-exchanged water which will be used as hot water or heating water.

The dummy pipe 140 is disposed in between the heat exchange pipes 120 in such a manner that it passes through both the opposite side plates of the body section 110 and the opposite water housings 130. The dummy pipe does not allow the water to flow therethrough, and opposite ends thereof pass through the water housings and exposed to the outside.

The opposite ends of the dummy pipe 140 may be either open or closed.

Like this, when some of the heat exchange pipes 120 are replaced by such a dummy pipe through which water does not flow, an amount of water flow decreases correspondingly, reducing water pressure to be applied to respective water housings. That is, the dummy pipe serves to distribute water pressure.

In addition, the dummy pipe 140 is installed such that it is exposed to the outside while passing through the water housings 130, so it divides the internal space of the water housing 130.

Thus, it also divides water flow into sub-flows, guiding the water flow while ensuring a smooth flow. That is, the dummy pipe serves to guide water flow in a divided manner.

In the meantime, as shown in FIG. 4, the heat exchange pipes 120 are preferably divided into several groups G which are separated from each other. Each of the groups G includes the plurality of heat exchange pipes 120.

The separated groups G further facilitate smooth flowing of combustion gas that passes through the body section 110 of the heat exchanger from the upper side to the lower side and vice versa.

Here, if the flow rate of the combustion gas decreases, while heat-exchange time increases so as to improve thermal efficiency, the heat exchange pipes 120 and the body section 110 of the heat exchanger may be subjected to thermal deformation because of possible overheating, degrading the function of the heat exchanger.

Thus, it is preferred that the plurality of groups G of the heat exchange pipes be provided in a manner being separated with adequate intervals in order to ensure both smooth flowing of combustion gas and sufficient heat-exchange time.

Here, when the plurality of groups G of the heat exchange pipes are provided as such, respective water housing 130 may have a size and a shape to connect two adjacent groups G.

Further, the dummy pipe 140 may be disposed in one or more of the groups G. More than one dummy pipe 140 may be disposed in one group G, and if needed, any of the groups G may have no dummy pipe 140.

FIG. 4 illustrated that a single dummy pipe was disposed for each groups G.

Particularly, as shown in the drawing, when the dummy pipe 140 is preferably disposed at the center of the group G, the dummy pipe is naturally disposed while passing through the center of the water housings 130, thereby evenly distributing water sub-flows in all directions.

Here, to cope with an effect of combustion gas that volume decreases as the temperature decreases during heat exchange, the body section 110 of the heat exchanger is generally provided with a guide 111 of the combustion gas, a width of which gradually decreases as it goes downwards.

Thus, because of the presence of the guide 111, the number of the heat exchange pipes 120 constituting the group G varies, so it is preferred that the dummy pipe 140 be disposed as close to the center of the heat exchange pipes 120 as possible.

Although the preferred embodiment of the present invention has been disclosed for illustrative purposes, those skilled in the art will appreciate that various modifications, additions and substitutions are possible, without departing from the scope and spirit of the invention.

Therefore, the embodiments described herein are provided to allow those skilled in the art to completely understand the scope of the present invention, so it should be understood that the embodiments described are merely illustrative in all aspects but not limiting, and the present invention is defined within the scope of claims of the present invention.

The invention claimed is:

1. A condensation heat exchanger comprising:
a body section (110) surrounded by side plates while being open at upper and lower portions thereof;
a plurality of heat exchange pipes (120) closely arranged between opposite side plates of the body section while passing therethrough, with a gap through which a hot combustion gas passes;
a plurality of water housings (130) assembled to outer surfaces of the opposite side plates of the body section (110) and configured to connect the plurality of heat exchange pipes (120) together so that water flows through the plurality of heat exchange pipes (120); and
a plurality of dummy pipes (140) arranged among the plurality of heat exchange pipes (120) while passing through both the opposite side plates of the body section (110) and the plurality of water housings (130) attached to the outer surfaces thereof, with both ends of each of the plurality of dummy pipes (140) being exposed outside of the plurality of water housings (130), so as to guide water flow smoothly while distributing water pressure applied to the plurality of water housings (130),
wherein each of the plurality of dummy pipes passes through the body section and two water housings, among the plurality of water housings (130), assembled to respective outer surfaces of the opposite side plates of the body section, both ends of the each of the plurality of dummy pipes protrude outward from the two water housings,
wherein the plurality of heat exchange pipes (120) are divided into a plurality of groups (G) separated from each other,
wherein the plurality of water housings (130) connect the plurality of groups (G) together,
wherein one of the plurality of dummy pipes (140) is disposed in one or more groups (G), and
wherein the one of the plurality of dummy pipes (140) is disposed at a center of the respective group (G).

* * * * *